United States Patent
Kojima et al.

(10) Patent No.: US 9,673,446 B2
(45) Date of Patent: Jun. 6, 2017

(54) LITHIUM ION SECONDARY BATTERY CONTAINING A NEGATIVE ELECTRODE MATERIAL LAYER CONTAINING SI AND O AS CONSTITUENT ELEMENTS

(75) Inventors: Eri Kojima, Kyoto (JP); Takahiro Furutani, Kyoto (JP); Mitsuhiro Kishimi, Kyoto (JP)

(73) Assignee: HITACHI MAXELL, LTD., Ibaraki-Shi, Osaka (JP)

( * ) Notice: Subject to any disclaimer, the term of this patent is extended or adjusted under 35 U.S.C. 154(b) by 243 days.

(21) Appl. No.: 13/701,118

(22) PCT Filed: Feb. 28, 2012

(86) PCT No.: PCT/JP2012/054867
§ 371 (c)(1),
(2), (4) Date: Nov. 30, 2012

(87) PCT Pub. No.: WO2013/128559
PCT Pub. Date: Sep. 6, 2013

(65) Prior Publication Data
US 2013/0224575 A1   Aug. 29, 2013

(51) Int. Cl.
*H01M 4/13*   (2010.01)
*H01M 4/36*   (2006.01)
(Continued)

(52) U.S. Cl.
CPC ........... *H01M 4/134* (2013.01); *H01M 4/133* (2013.01); *H01M 4/386* (2013.01); *H01M 10/0568* (2013.01); *H01M 2004/021* (2013.01)

(58) Field of Classification Search
CPC ........ H01M 2/162; H01M 2/16; H01M 4/134; H01M 4/386; H01M 4/133; H01M 10/0568
(Continued)

(56) References Cited

U.S. PATENT DOCUMENTS

2003/0108801 A1* 6/2003 Otsuki et al. ............... 429/339
2003/0113636 A1   6/2003 Sano et al.
(Continued)

FOREIGN PATENT DOCUMENTS

CN   101276932 A   10/2008
JP   2002-25606 A   1/2002
(Continued)

OTHER PUBLICATIONS

Schalkwijk et al., "Advances in Lithium-Ion Batteries", ISBN: 0-306-47356-9, 2002, p. 167-168.*
(Continued)

*Primary Examiner* — Kenneth Douyette
(74) *Attorney, Agent, or Firm* — Birch, Stewart, Kolasch & Birch, LLP (57) ABSTRACT

A lithium ion secondary battery containing a negative electrode active material containing Si and O as constituent elements and exhibiting excellent charge-discharge cycle characteristics. The lithium ion secondary battery has a positive electrode having a positive electrode material mixture layer, a negative electrode, a separator and a nonaqueous electrolyte containing at least an electrolyte salt and an organic solvent, where the negative electrode has a negative electrode material mixture layer containing a negative electrode active material containing Si and O as constituent elements (the atomic ratio x of O to Si is $0.5 \leq x \leq 1.5$). The nonaqueous electrolyte contains the electrolyte salt at a concentration exceeding a concentration at which conductivity in the nonaqueous electrolyte containing the electrolyte salt and the organic solvent is maximized, and the conductivity at 25° C. is 6.5 to 16 mS/cm.

4 Claims, 2 Drawing Sheets

(51) Int. Cl.
*H01M 4/134* (2010.01)
*H01M 4/133* (2010.01)
*H01M 4/38* (2006.01)
*H01M 10/0568* (2010.01)
*H01M 4/02* (2006.01)

(58) Field of Classification Search
USPC ......... 429/231.1, 144, 223, 224, 199, 218.1, 429/188, 231.8
See application file for complete search history.

(56) References Cited

U.S. PATENT DOCUMENTS

| | | | |
|---|---|---|---|
| 2003/0170549 A1* | 9/2003 | Murai | H01M 10/0567 429/329 |
| 2005/0123835 A1* | 6/2005 | Sun | H01M 10/0568 429/326 |
| 2006/0172201 A1* | 8/2006 | Yasukawa | H01M 4/133 429/329 |
| 2006/0204855 A1 | 9/2006 | Saruwatari et al. | |
| 2007/0009797 A1* | 1/2007 | Takami et al. | 429/231.1 |
| 2007/0026318 A1* | 2/2007 | Kishi et al. | 429/341 |
| 2007/0111093 A1 | 5/2007 | Kashiwagi et al. | |
| 2008/0014497 A1 | 1/2008 | Sano et al. | |
| 2008/0241701 A1 | 10/2008 | Okumura et al. | |
| 2009/0029261 A1* | 1/2009 | Thomas-Alyea et al. | 429/248 |
| 2010/0297509 A1 | 11/2010 | Okumura et al. | |
| 2011/0008681 A1* | 1/2011 | Koh et al. | 429/331 |
| 2011/0159370 A1* | 6/2011 | Inaba et al. | 429/231.1 |
| 2011/0159379 A1* | 6/2011 | Matsumoto et al. | 429/326 |
| 2011/0262796 A1* | 10/2011 | Shimooka et al. | 429/144 |
| 2011/0274977 A1* | 11/2011 | Nakura | 429/223 |

FOREIGN PATENT DOCUMENTS

| | | |
|---|---|---|
| JP | 2003-173821 A | 6/2003 |
| JP | 2003-243029 A | 8/2003 |
| JP | 2003-317717 A | 11/2003 |
| JP | 2006-253081 A | 9/2006 |
| JP | 2007-184261 A | 7/2007 |
| JP | 2007-207699 A | 8/2007 |
| JP | 2008-166013 A | 7/2008 |
| JP | 2008-198524 A | 8/2008 |
| JP | 2009-76372 A | 4/2009 |
| JP | 2010-263058 A | 11/2010 |
| JP | 2011-113863 A | 6/2011 |
| JP | 2011-192561 A | 9/2011 |
| WO | WO 2008/065984 A1 | 6/2008 |

OTHER PUBLICATIONS

Office Action for corresponding Japanese Patent Application No. 2012-524006, dated Jul. 17, 2012.

Chinese Office Action and Search Report, dated Feb. 17, 2015, for Chinese Application No. 201280001515.2.

\* cited by examiner

LITHIUM ION SECONDARY BATTERY CONTAINING A NEGATIVE ELECTRODE MATERIAL LAYER CONTAINING SI AND O AS CONSTITUENT ELEMENTS

TECHNICAL FIELD

The present invention relates to a lithium ion secondary battery that includes a negative electrode active material containing Si and O as constituent elements and that exhibits excellent charge-discharge cycle characteristics.

BACKGROUND ART

Nonaqueous electrolyte secondary batteries including lithium ion secondary batteries provide a high voltage and a high capacity, and therefore such batteries are widely used as power sources for various portable devices. In recent years, their applications are spreading to medium and large size applications such as power tools including electric tools, electric vehicles and electric bicycles.

Under the circumstances, there has been a demand for a higher capacity of such a lithium ion secondary battery, and for the purpose, research and development of electrode active materials exhibiting a high charge-discharge capacity has proceeded. Among them, for the negative electrode active material, materials such as silicon (Si) and tin (Sn) that are capable of occluding and releasing more lithium (ions) have received attention in place of carbonaceous materials such as graphite that has been employed in conventional lithium ion secondary batteries. In particular, $SiO_x$ having a structure where ultrafine particles of Si are dispersed in $SiO_2$ has been known also as having excellent load characteristics and the like.

However, since $SiO_x$ experiences a great change in volume as a result of charge and discharge of a battery, in a battery using this, the battery characteristics may deteriorate rapidly due to repetition of charge and discharge.

Research and development for solving this problem have been done. For example, Patent document 1 proposes a nonaqueous secondary battery having high capacity and ensuring high battery characteristics by combining a negative electrode using graphite in conjunction with $SiO_x$ and a positive electrode using a Li-containing transition metal oxide of a specific formulation and by further controlling potential of the negative electrode at the time of discharging to 2.5 V.

In an alternative technique, it is also known to adjust the construction of the nonaqueous electrolyte used for a lithium ion secondary battery, thereby improving the battery characteristics of the lithium ion secondary battery (for example, Patent documents 2-4).

PRIOR ART DOCUMENTS

Patent documents

Patent document 1: JP 2011-113863
Patent document 2: JP 2003-173821
Patent document 3: JP 2003-243029
Patent document 4: JP 2011-192561

DISCLOSURE OF INVENTION

Problem to be Solved by the Invention

Therefore, with the foregoing in mind, it is an object of the present invention to provide a lithium ion secondary battery that includes negative electrode active material containing Si and O as constituent elements and that exhibits excellent charge-discharge cycle characteristics.

Means for Solving Problem

A lithium ion secondary battery of the present invention that can achieve the above-mentioned object has a positive electrode having a positive electrode material mixture layer, a negative electrode, a separator, and a nonaqueous electrolyte containing at least an electrolyte salt and an organic solvent, where the negative electrode has a negative electrode material mixture layer including a negative electrode active material containing Si and O as constituent elements (it should be noted that the atomic ratio x of O to Si is $0.5<x<1.5$; hereinafter, the material is recited as $SiO_x$). In the nonaqueous electrolyte in use, the concentration of the electrolyte salt exceeds a concentration at which the conductivity in a nonaqueous electrolyte containing the electrolyte salt and the organic solvent is maximized, and the conductivity at 25° C. is 6.5 to 16 mS/cm.

Effects of the Invention

According to the present invention, it is possible to provide a lithium ion secondary battery that includes a negative electrode active material containing Si and O as constituent elements and that exhibits excellent charge-discharge cycle characteristics.

BRIEF DESCRIPTION OF DRAWINGS

FIG. 1 includes schematic views for showing an example of a lithium ion secondary battery of the present invention.

DESCRIPTION OF THE INVENTION

When charge and discharge are repeated in a lithium ion secondary battery having a negative electrode containing $SiO_x$, due to $SiO_x$ expansion and contraction caused by the charge and discharge, the $SiO_x$ particles are pulverized to form a newly generated surface. On this newly generated surface, highly-active Si (the details are explained below) contained in $SiO_x$ is exposed and the Si causes decomposition of the nonaqueous electrolyte, thereby forming a SEI (Solid Electrolyte Interface) coating film that includes the lithium ion derived from the electrolyte salt in the nonaqueous electrolyte and the decomposition product of the nonaqueous electrolyte components.

This SEI coating film that prevents a direct contact between the $SiO_x$ newly generated surface and the nonaqueous electrolyte serves to suppress the decomposition of the nonaqueous electrolyte on this newly generated surface. However, since the newly generated surface is generated one after another as a result of the development of pulverization of the $SiO_x$ particles due to the charge and discharge of the battery, formation of the SEI coating film to cover the newly generated surface is also repeated to promote consumption of the electrolyte salt in the nonaqueous electrolyte, thereby the amount of the electrolyte salt is decreased (i.e., the concentration of the electrolyte salt in the nonaqueous electrolyte is lowered).

As the result of intensive studies, the inventors have found that in a lithium ion secondary battery having a negative electrode containing $SiO_x$, degradation in the conductivity of the nonaqueous electrolyte, which is caused by the decrease in the amount of the electrolyte salt in the nonaqueous electrolyte caused by the charge and discharge, is one factor to degrade the charge-discharge cycle characteristics.

In order to cope with this, in the lithium ion secondary battery of the present invention, a negative electrode containing $SiO_x$ is combined with a nonaqueous electrolyte containing an electrolyte salt at a concentration exceeding a concentration at which the conductivity is maximized, so that the degradation in the conductivity of the nonaqueous electrolyte can be minimized even when the consumption of the electrolyte salt proceeds after repeated charge and discharge, thereby enhancing the charge-discharge cycle characteristics.

In the negative electrode regarding the lithium ion secondary battery of the present invention, a negative electrode material mixture layer containing a negative electrode active material, a binder or optionally a conductivity enhancing agent is provided on one or both surfaces of a current collector.

For the negative electrode active material, $SiO_x$ is used. $SiO_x$ may contain microcrystalline or amorphous phase of Si. In this case, the atomic ratio of O to Si is the ratio including Si microcrystals or amorphous phase Si. In other words, $SiO_x$ only needs to have a structure in which Si (for example, microcrystalline Si) is dispersed in an amorphous $SiO_2$ matrix, and the atomic ratio x satisfies $0.5 \leq x \leq 1.5$ including the amorphous $SiO_2$ and the Si dispersed in the amorphous $SiO_2$. For example, in the case of a material having the structure in which Si is dispersed in the amorphous $SiO_2$ matrix and a molar ratio of $SiO_2$ to Si of 1:1, because x=1, the structural formula is expressed by SiO. In the case of the material having such a structure, for example, no peak indicating the presence of Si (microcrystalline Si) may be observed by X ray diffractometry, but the presence of fine Si can be confirmed with a transmission electron microscope.

It is preferable that $SiO_x$ forms a composite with a carbon material, and it is desirable that, for example, the $SiO_x$ surface is covered with the carbon material. Since $SiO_x$ has poor conductivity, in a case of using this as a negative electrode active material, it is necessary to form an excellent conductive network by using a conductive material (conductivity enhancing agent) and providing good mixing/dispersion of $SiO_x$ and the conductive material within the negative electrode from the viewpoint of ensuring favorable battery characteristics. With a composite of $SiO_x$ with a carbon material, for example, a better conductive network is formed in the negative electrode than when a material obtained by simply mixing $SiO_x$ and a conductive material such as a carbon material is used.

As the composite of $SiO_x$ with a carbon material, in addition to the composite in which the $SiO_x$ surface is covered with a carbon material as described above, granules or the like of $SiO_x$ and a carbon material can be used.

By further forming a composite using the composite in which the $SiO_x$ surface is covered with a carbon material and a conductive material such as a carbon material and using the formed composite, an even better conductive network can be formed in the negative electrode, and it is therefore possible to attain a lithium ion secondary battery having a higher capacity and more excellent battery characteristics (for example, charge-discharge cycle characteristics). As the composite of a carbon material with $SiO_x$ covered with a carbon material, for example, granules obtained by granulating a mixture of $SiO_x$ covered with a carbon material and a carbon material can be used.

As the $SiO_x$ whose surface is covered with a carbon material, a composite (for example, granules) of $SiO_x$ and a carbon material having a specific resistance smaller than that of $SiO_x$ can be used, and preferably, a composite obtained by further covering the surface of the composite of $SiO_x$ with a carbon material can be used preferably. When $SiO_x$ and the carbon material are dispersed within the granules, a better conductive network can be formed. Accordingly, battery characteristics such as heavy load discharge characteristics can be further improved in the lithium ion secondary battery having the negative electrode containing $SiO_x$ as a negative electrode active material.

As the conductive material that can be used to form a composite with $SiO_x$, for example, it is preferable to use a carbon material such as low crystalline carbon, carbon nanotubes, and vapor-phase grown carbon fibers.

More specifically, the conductive material is preferably at least one selected from the group consisting of a fibrous or coiled carbon material, carbon black (including acetylene black and Ketjen black), artificial graphite, easily-graphitizable carbon and hardly-graphitizable carbon. The fibrous or coiled carbon material is preferable in that a conductive network can be easily formed and the surface area is large. Carbon black (including acetylene black and Ketjen black), easily-graphitizable carbon and hardly-graphitizable carbon are preferable in that they have high conductivity and a high electrolyte-retaining ability and can easily maintain contact with $SiO_x$ particles even if the $SiO_x$ particles expand and contract.

As mentioned below, it is preferable that graphite is also used as the negative electrode active material. The graphite can be used also as a carbon material regarding the composite of $SiO_x$ and a carbon material. Similarly to carbon black and the like, graphite has high conductivity and a high electrolyte-retaining ability and can easily maintain contact with $SiO_x$ particles even if the $SiO_x$ particles expand and contract, and thus it can be used preferably for forming a composite with $SiO_x$.

Among the carbon materials listed above, it is particularly preferable to use a fibrous carbon material in the case of the $SiO_x$ composite being in the form of granules. This is because the fibrous carbon material has a thin thread-like shape and is highly flexible, it can follow expansion and contraction of $SiO_x$ due to charge and discharge of the battery, and also because the fibrous carbon material has a large bulk density, and thus it can have a large number of contact points with the $SiO_x$ particles. Examples of the fibrous carbon include polyacrylonitrile (PAN)-based carbon fibers, pitch-based carbon fibers, vapor-phase grown carbon fibers and carbon nanotubes, and any of these can be used.

The fibrous carbon material may be formed on the surface of $SiO_x$ particles by, for example, a vapor phase method.

$SiO_x$ usually has a specific resistance of $10^3$ kΩcm or more and $10^7$ kΩcm or less, whereas the conductive materials listed above usually have a specific resistance of $10^{-5}$ kΩcm or more and 10 kΩcm or less. The composite of $SiO_x$ with a conductive material may further include a material layer (a material layer containing hardly-graphitizable carbon) covering the carbon material-covering layer on the particle surface.

In the case where the composite of $SiO_x$ with a carbon material is used in the negative electrode, from the viewpoint of well exhibiting the action of forming a composite with a carbon material, the ratio of the carbon material is preferably 5 mass parts or more, and more preferably 10 mass parts or more based on 100 mass parts of $SiO_x$. In the above-described composite, if the proportion of the carbon material that forms a composite with $SiO_x$ is too high, it leads to reduction of the amount of $SiO_x$ in the negative electrode material mixture layer, and the effect of achieving high capacity may become small. Accordingly, the amount of the carbon material is preferably 50 mass parts or less, and more preferably 40 mass parts or less based on 100 mass parts of $SiO_x$.

The composite of $SiO_x$ with a carbon material can be obtained by, for example, the following method.

First, a production method in the case of forming a composite using $SiO_x$ will be described. A dispersion in which $SiO_x$ is dispersed in a dispersing medium is prepared, and the dispersion is sprayed and dried to produce composite particles including a plurality of particles. As the dispersing medium, for example, ethanol or the like can be used. Usually, it is appropriate that the dispersion is sprayed in an atmosphere of 50° C. or higher and 300° C. or lower. The same composite particles can be produced by methods other than the above-described method, such as a mechanical granulation method using a vibrating or planetary ball mill or rod mill.

In the case of producing granules made of $SiO_x$ and a carbon material having a specific resistance smaller than that of $SiO_x$, the composite particles (granules) can be produced by performing the same method as that for forming a composite containing $SiO_x$, with the use of a dispersion obtained by adding the carbon material to a dispersion in which $SiO_x$ is dispersed in a dispersing medium. Also, the granules of $SiO_x$ and a carbon material can be produced by a granulation method similar to the mechanical granulation method described above.

Next, in the case of forming a composite by covering the surface of $SiO_x$ particles ($SiO_x$ composite particles, or granules made of $SiO_x$ and a carbon material) with a carbon material, for example, $SiO_x$ particles and a hydrocarbon-based gas are heated in a vapor phase so as to cause carbon produced by pyrolytic decomposition of the hydrocarbon-based gas to deposit on the particle surface. With the chemical vapor deposition (CVD) method as described above, the hydrocarbon-based gas can be distributed throughout the composite particles, and a thin and uniform coating film (carbon material-covering layer) containing a conductive carbon material can be formed on the particle surface and in the surface pores. Accordingly, conductivity can be imparted uniformly to the $SiO_x$ particles with the use of a small amount of carbon material.

In the production of the $SiO_x$ covered with a carbon material, the processing temperature (atmospheric temperature) of the chemical vapor deposition (CVD) method varies depending on the type of hydrocarbon-based gas, but usually a temperature of 600° C. or more and 1200° C. or less is appropriate. Particularly, the processing temperature is preferably 700° C. or more, and more preferably 800° C. or more. This is because a high processing temperature causes less residual impurities and can form a covering layer containing a highly conductive carbon.

As a liquid source for hydrocarbon-based gas, toluene, benzene, xylene, mesitylene or the like can be used, but toluene is particularly preferable because it is easy to handle. A hydrocarbon-based gas can be obtained by vaporizing any of these (by for example, bubbling with a nitrogen gas). It is also possible to use a methane gas, an acetylene gas or the like.

After the surface of $SiO_x$ particles ($SiO_x$ composite particles, or granules made of $SiO_x$ and a conductive material) has been covered with a carbon material by the chemical vapor deposition (CVD) method, at least one organic compound selected from the group consisting of a petroleum-based pitch, a coal-based pitch, a thermosetting resin, and a condensate of naphthalene sulphonate with an aldehyde may be attached to the covering layer containing a carbon material and the particles having the organic compound attached thereto may be baked.

Specifically, a dispersion in which $SiO_x$ particles ($SiO_x$ composite particles, or granules made of $SiO_x$ and a carbon material) covered with a carbon material and the organic compound are dispersed in a dispersing medium is prepared, and the dispersion is sprayed and dried to form particles covered with the organic compound, and the particles covered with the organic compound are baked.

The pitch can be an isotropic pitch, and the thermosetting resin can be a phenolic resin, a furan resin, a furfural resin or the like. The condensate of naphthalene sulphonate with an aldehyde can be a naphthalene sulphonate formaldehyde condensate.

The dispersing medium for dispersing the $SiO_x$ particles covered with a carbon material and the organic compound can be, for example, water or an alcohol (ethanol or the like). Usually, it is appropriate that the dispersion is sprayed in an atmosphere of 50° C. or higher and 300° C. or lower. It is appropriate that the baking temperature is usually 600° C. or higher and 1200° C. or lower, but the baking temperature is preferably 700° C. or higher, and more preferably 800° C. or higher. This is because a high processing temperature causes less residual impurities and can form a covering layer containing a highly conductive and good quality carbon. It should be noted, however, that the processing temperature has to be lower than or equal to the melting point of $SiO_x$.

It is preferable that graphite is used in combination with $SiO_x$ (preferably a composite of $SiO_x$ and a carbon material) for the negative electrode active material. $SiO_x$ has a higher capacity in comparison with a carbon material widely used as a negative electrode active material for a lithium ion secondary battery, and at the same time, it has a great volume change caused by charge and discharge of the battery as mentioned above. Thus, in a lithium ion secondary battery using a negative electrode having a negative electrode material mixture layer with a high proportion of $SiO_x$, the battery characteristics are degraded due to the degradation in conductivity of the nonaqueous electrolyte as mentioned above at the time of repeating charge and discharge, and in addition to that, deterioration occurs due to the great volume change of the negative electrode (negative electrode material mixture layer), thereby the battery characteristics may be degraded.

Graphite has been used widely as a negative electrode active material for a lithium ion secondary battery. While it has a relatively large capacity, its volume change caused by charge and discharge of the battery is smaller than that of $SiO_x$. Therefore, by using $SiO_x$ and graphite in combination for the negative electrode active material, it is possible to minimize the decrease in the effect of increasing the battery capacity caused by the decrease in the use amount of $SiO_x$, and it is useful in suppressing degradation in the battery characteristics caused by the deterioration of the negative electrode due to the repeated charge and discharge. As a result, it is possible to provide a lithium ion secondary battery having further excellent charge-discharge cycle characteristics.

Examples of the graphite used as a negative electrode active material together with the $SiO_x$ include natural graphite such as scale-shaped graphite; and artificial graphite obtained by graphitizing an easily-graphitizable carbon such as pyrolytic carbons, mesophase carbon microbeads (MCMB), or carbon fibers at 2800° C. or higher.

In a case of using graphite and a composite of $SiO_x$ with a carbon material in combination for the negative electrode active material, the proportion of the composite of $SiO_x$ and a carbon material preferably is 0.01 mass % or more, more preferably 1 mass % or more, and even more preferably 3 mass % or more of the entire negative electrode active material from the viewpoint of favorably ensuring the effect resulting from use of $SiO_x$, i.e., the effect of increasing the capacity. Further, the proportion of the composite of $SiO_x$ and a carbon material preferably is 20 mass % or less, and more preferably 15 mass % or less of the entire negative electrode active material from the viewpoint of favorably avoiding problems due to changes in the volume of $SiO_x$ caused by charge and discharge.

It is preferable that the proportion of the negative electrode active material in the negative electrode material mixture layer (total proportion of the entire negative electrode active material) is 80 to 99 mass %.

As the binder used in the negative electrode material mixture layer, examples include: polysaccharides such as starch, polyvinyl alcohol, polyacrylic acid, carboxymethyl cellulose (CMC), hydroxypropyl cellulose, regenerated cellulose and diacetyl cellulose and modified products thereof; thermoplastic resins such as polyvinyl chloride, polyvinyl pyrrolidone, polytetrafluoroethylene, polyvinylidene fluoride (PVDF), polyethylene, polypropylene, polyamideimide, and polyamide and modified products thereof, polyimide; elastically resilient polymers such as ethylene-propylene-dieneter polymer (EPDM), sulfonated EPDM, styrene butadiene rubber (SBR), butadiene rubber, polybutadiene, fluorocarbon rubber and polyethylene oxide and modified products thereof. These materials may be used individually or in combination of two or more.

It is preferable that the proportion of the binder in the negative electrode material mixture layer (total proportion of the entire binder) is 1 to 20 mass %.

A conductive material as a conductivity enhancing agent may further be added to the negative electrode material mixture layer. Such a conductive material is not particularly limited as long as it does not chemically react in the battery. For example, materials such as carbon black (e.g., thermal black, furnace black, channel black, Ketjen Black, and acetylene black), carbon fiber, metal powders (e.g., powders of copper, nickel, aluminum, and silver), metal fiber, polyphenylene derivative (the one described in JP S59-20971) can be used individually or in combination of two or more. Among these materials, it is preferable to use carbon black, and more preferably Ketjen Black or acetylene black.

It is preferable that the particle diameter of the carbon material used as the conductivity enhancing agent is 0.01 μm or more, as an average particle diameter measured in the same manner as the above-mentioned method for measuring the average fiber length or an average particle diameter ($D_{50}$%) measured by dispersing these fine particles in a medium by using a laser scattering particle size distribution analyzer (such as "LA-920" manufactured by Horiba Ltd).

More preferably the particle diameter is 0.02 μm or more. Preferably, the particle diameter is 10 μm or less, and more preferably, 5 μm or less.

In a case of adding a conductive material as a conductivity enhancing agent to the negative electrode material mixture layer, it is preferable that the proportion of the negative electrode active material and the proportion of the binder in use are within the ranges satisfying the above-mentioned favorable values.

For example, the negative electrode can be produced by dispersing in a solvent such as N-methyl-2-pyrolidone (NMP) or water, the negative electrode active material, the binder, and a conductive enhancing agent to be used optionally (note that the binder may be dissolved in the solvent) so as to prepare a negative electrode material mixture containing composition in the form of a paste or slurry, applying the obtained composition onto one surface or both surfaces of a current collector, drying the applied composition, and optionally subjecting the current collector to calendering after the drying. The method for producing the negative electrode is not limited to this, and the negative electrode may be produced by other production methods. The thickness of the negative electrode material mixture layer is preferably 10 to 140 μm for one surface of the current collector.

As the current collector used in the negative electrode, a metal foil, punched metal, metal mesh, expanded metal or the like made of copper or nickel can be used, but generally a copper foil is used. When reducing the thickness of the negative electrode as a whole to achieve a battery with a high energy density, an upper limit to the thickness of the negative electrode current collector is preferably 30 μm and a lower limit to the thickness of the negative electrode current collector is desirably 5 μm in order to ensure the mechanical strength.

The nonaqueous electrolyte of the present invention contains at least an electrolyte salt and an organic solvent, and it is a solution obtained by dissolving the electrolyte salt in the organic solvent.

An organic solvent to be used for the nonaqueous electrolyte is not particularly limited as long as it dissolves the electrolyte salt and does not cause side reactions such as decomposition in the working voltage range of the battery. Examples of the organic solvents include: cyclic carbonates such as ethylene carbonate (EC), propylene carbonate (PC), and butylene carbonate; chain carbonates such as dimethyl carbonate (DMC), diethyl carbonate (DEC) and methyl ethyl carbonate; chain esters such as methyl propionate; cyclic esters such as γ-butyrolactone; chain ethers such as dimethoxyethane, diethyl ether, 1,3-dioxolane, diglyme, triglyme and tetraglyme; cyclic ethers such as dioxane, tetrahydrofuran and 2-methyltetrahydrofuran; nitriles such as acetonitrile, propionitrile and methoxypropionitrile; and sulfurous esters such as ethylene glycol sulfite. These may be used in combination of two or more. It is desirable to use those capable of providing high conductivity when used in combination, for example, a mixed solvent of ethylene carbonate and chain carbonate in order to achieve a battery with more favorable characteristics.

The electrolyte salt to be used in the nonaqueous electrolyte is not particularly limited as long as it dissociates in the solvent to produce lithium ions and is less susceptible to side reactions such as decomposition in the working voltage range of the battery. For example, inorganic lithium salts such as $LiClO_4$, $LiPF_6$, $LiBF_4$, $LiAsF_6$ and $LiSbF_6$; and organic lithium salts such as $LiCF_3SO_3$, $LiCF_3CO_2$, $Li_2C_2F_4(SO_3)_2$, $LiC(CF_3SO_2)_3$, $LiC_nF_{2n+1}SO_3$ (n≥2), imide salts

[for example, lithium imide salts such as $LiN(CF_3SO_2)_2$, $LiN(C_2F_5SO_2)_2$; and fluorine-containing lithium imide salts such as $LiN(RfOSO_2)_2$ (where Rf represents a fluoroalkyl group) can be used]. For the electrolyte salts, the above-listed materials may be used individually or in combinations of two or more. Among these electrolyte salts, $LiPF_6$, $LiBF_4$, and imide salts are more preferred from the viewpoint of their ability of further improving the conductivity of the nonaqueous electrolyte.

As the nonaqueous electrolyte regarding the lithium ion secondary battery of the present invention, a nonaqueous electrolyte that includes an electrolyte salt at a concentration exceeding a concentration at which the conductivity (electric conductivity) in the nonaqueous electrolyte containing the electrolyte salt and an organic solvent for dissolving the electrolyte salt is maximized is used. As a result, the charge-discharge cycle characteristics of the battery can be improved irrespective of use of a negative electrode containing $SiO_x$.

Regarding the lithium ion secondary battery, it is also known to increase the thickness of the positive electrode material mixture layer and/or the negative electrode material mixture layer and to increase the amount of the active material to be introduced into the battery, as a process for increasing the capacity. In this case, the concentration gradient of the lithium ion in the electrode material mixture layers (the positive electrode material mixture layer and the negative electrode material mixture layer) becomes great and the lithium ion concentration is lowered at the depth (in the vicinity of the current collector) of the electrode material mixture layers. As a result, the active material present in the regions cannot occlude and release the lithium ion sufficiently, and thus, the effect of increasing the capacity cannot be expressed sufficiently even by increasing the thickness of the electrode material mixture layers.

However, in a case of using a nonaqueous electrolyte in which the concentration of the electrolyte salt exceeds a concentration at which the conductivity in the nonaqueous electrolyte including the electrolyte salt and the organic solvent for dissolving the electrolyte salt is maximized, even if the thickness of the electrode material mixture layers is increased, the concentration gradient of the lithium ion within the layers can be relieved, and the active material present at the depth of the electrode material mixture layers can be also concerned effectively with the battery reactions, and thus the effect of the high capacity can be expressed more favorably.

Further, the nonaqueous electrolyte used for the lithium ion secondary battery of the present invention may cause degradation of the battery characteristics if the conductivity is too low. Therefore, the nonaqueous electrolyte to be used for the lithium ion secondary battery of the present invention preferably has a conductivity at 25° C. of 6.5 mS/cm or more, preferably, 8.5 mS/cm or more; the conductivity is 16 mS/cm or less, and preferably, 15 mS/cm or less.

The conductivity of the nonaqueous electrolyte varies depending on the types or the like of the electrolyte salts and/or the organic solvents in use. Nevertheless, the concentration of the electrolyte salt of the nonaqueous electrolyte used in assembling a lithium ion secondary battery can be set so that the concentration exceeds a concentration at which the conductivity in the nonaqueous electrolyte containing the electrolyte salt and the organic solvent for dissolving the same is maximized, and also with reference to the conductivity at 25° C. for example as mentioned above. More specifically, it is preferable that the concentration of the electrolyte salt in the nonaqueous electrolyte is higher than 1.0 mol/L (liter) and more preferably, higher than 1.2 mol/L. Preferably, it is lower than 30 mol/L (liter) and more preferably, lower than 5 mol/L.

In a case of using two or more kinds of electrolyte salts in combination, the concentration of the electrolyte salt in the nonaqueous electrolyte of the present invention indicates the total of the concentrations of the respective electrolyte salts. Namely, for example, in a case of a nonaqueous electrolyte containing an electrolyte salt A at a concentration of a mol/L and an electrolyte salt B at a concentration of b mol/L, the concentration of the electrolyte salt is "(a+b) mol/L".

Further, in the case of using two or more kinds of electrolyte salts in combination, "a concentration at which the conductivity in the nonaqueous electrolyte containing the electrolyte salt and the organic solvent for dissolving the electrolyte salt is maximized" and "a concentration exceeding a concentration at which the conductivity is maximized" indicate respectively a concentration at which the conductivity is maximized and a concentration exceeding the above concentration, when the molar ratio of the at least two kinds of electrolyte salts used in combination is fixed and the concentrations of these electrolyte salts in the nonaqueous electrolyte are changed.

It is preferable that the nonaqueous electrolyte contains halogen-substituted cyclic carbonate. The halogen-substituted cyclic carbonate in the nonaqueous electrolyte helps formation of a SEI coating film on the surface of the negative electrode active material, and improves further the quality of the SEI coating film. Therefore, in a case of using a nonaqueous electrolyte containing a halogen-substituted cyclic carbonate, the charge-discharge cycle characteristics of the lithium ion secondary battery can be improved further.

For the halogen-substituted cyclic carbonate, a compound expressed with the following General Formula (1) can be employed.

[Chemical Formula 1]

(1)

In the above General Formula (1), $R^1$, $R^2$, $R^3$ and $R^4$ represent hydrogen, a halogen, or an alkyl group having 1 to 10 carbon atoms; a part or all of the hydrogen of the alkyl group may be substituted with a halogen; at least one of $R^1$, $R^2$, $R^3$ and $R^4$ is a halogen; and $R^1$, $R^2$, $R^3$ and $R^4$ may be different from each other or at least two thereof may be identical to each other. In a case where $R^1$, $R^2$, $R^3$ and $R^4$ are alkyl groups, a smaller carbon number is preferred. For the halogen, fluorine is preferred in particular.

For a halogen-substituted cyclic carbonate, 4-fluoro-1,3-dioxolan-2-one (FEC) is preferred in particular.

The content of the halogen-substituted cyclic carbonate in the nonaqueous electrolyte used for a lithium ion secondary battery is preferably 0.1 mass % or more, and more preferably 0.5 mass % or more from the viewpoint of ensuring more favorably the effect obtained by its employment. However, when the content of the halogen-substituted cyclic carbonate in the nonaqueous electrolyte is too large, the battery may be bulged easily. Therefore, the content of the halogen-substituted cyclic carbonate in the nonaqueous electrolyte used for a lithium ion secondary battery is preferably 10 mass % or less, and more preferably 5 mass % or less.

It is preferable also that the nonaqueous electrolyte contains vinylene carbonate (VC). The VC in the nonaqueous electrolyte also helps formation of the SEI coating film on the surface of the negative electrode active material, and further improves the quality of the SEI coating film. The effect becomes remarkable particularly in a case of a battery equipped with a negative electrode containing graphite as a negative electrode active material. Therefore, in a case of using graphite in combination with $SiO_x$ for the negative electrode active material and using a nonaqueous electrolyte containing VC, the charge-discharge cycle characteristics of the lithium ion secondary battery can be improved further.

The VC proportion in the nonaqueous electrolyte used in the lithium ion secondary battery is preferably 1 mass % or more, and more preferably, 1.5 mass % or more. However, if the amount of VC in the nonaqueous electrolyte is too large, excessive gas generation may occur at the time of formation of the coating film, causing bulging of the battery case. Accordingly, in the nonaqueous electrolyte used for the lithium ion secondary battery, the VC proportion is preferably 10 mass % or less, and more preferably, 5 mass % or less.

For the purpose of improving the characteristics of the nonaqueous electrolyte such as safety, charge-discharge cycle characteristics and high-temperature storage characteristics, it is also possible to suitably add additives such as phosphonoacetates like triethylphosphonoacetate (TEPA), 1,3-propane sultone, diphenyl disulfide, cyclohexylbenzene, biphenyl, fluorobenzene, and t-butylbenzene.

As long as the lithium ion secondary battery of the present invention includes a positive electrode, a negative electrode, a separator and a nonaqueous electrolyte, in which the negative electrode is the above-mentioned negative electrode and the above-mentioned nonaqueous electrolyte is used, there is no particular limitation for the other constitutions and structures, and various constitutions and structures employed in conventionally known lithium ion secondary batteries can be applied.

For the positive electrode, for example, a positive electrode constituted by providing a positive electrode material mixture layer containing a positive electrode active material, a binder and a conductivity enhancing agent on one or both surfaces of the current collector can be used.

There is no particular limitation with respect to the positive electrode active material as long as it is a material used for a conventionally known lithium ion secondary battery, namely, an active material that can occlude and release Li ion. Specific examples thereof include lithium-containing transition metal oxides having a layered structure represented by $Li_{1+y}M^1O_2$ ($-0.1<y<0.1$, $M^1$: Co, Ni, Mn, Al, Mg, etc.); lithium manganese oxides having a spinel structure such as $LiMn_2O_4$ and substituted $LiMn_2O_4$ in which a part of the elements is substituted by another element; and olivine-type compounds represented by $LiM^2PO_4$ ($M^2$: Co, Ni, Mn, Fe, etc.). Specific examples of the lithium-containing transition metal oxides having a layered structure include, in addition to $LiCoO_2$ and $LiNi_{1-a}Co_{a-b}Al_bO_2$ ($0.1 \leq a \leq 0.3$, $0.01 \leq b \leq 0.2$), oxides containing at least Co, Ni and Mn ($LiMn_{1/3}Ni_{1/3}Co_{1/3}O_2$, $LiMn_{5/12}Ni_{5/12}Co_{1/6}O_2$, $LiMn_{3/5}Ni_{1/5}Co_{1/5}O_2$, etc.).

The conductivity enhancing agent of the positive electrode is not limited particularly as long as it is chemically stable within the lithium ion secondary battery. The examples include: graphites such as natural graphite (scale-shaped graphite, etc.) and artificial graphite; carbon blacks such as acetylene black, Ketjen black (trade name), channel black, furnace black, lamp black, and thermal black; conductive fibers such as a carbon fiber and a metal fiber; metal powders such as an aluminum powder; carbon fluoride; zinc oxide; conductive whiskers of potassium titanate or the like; conductive metal oxides such as titanium oxide; and, organic conductive materials such as polyphenylene derivatives. These materials may be used individually or in combination of two or more. Among them, graphite having high conductivity and carbon black having excellent liquid-absorbing property are preferred. As one aspect of the conductivity enhancing agent, not only primary particles but aggregates such as secondary aggregates and a chain structure may be used. Such aggregates can be handled more easily and provide favorable productivity.

As a binder for use in the positive electrode, any of the binders listed for use as a binder in the negative electrode can be used.

For example, the positive electrode can be produced by dispersing in a solvent like NMP, the positive electrode active material, the binder and the conductive enhancing agent described above (note that the binder may be dissolved in the solvent) so as to prepare a positive electrode material mixture containing composition in the form of a paste or slurry, applying the obtained composition onto one or both surfaces of a current collector, drying the applied composition, and then optionally subjecting the current collector to calendering. The method for producing the positive electrode is not limited to this, and the positive electrode may be produced by other production methods.

As the current collector used in the positive electrode, it is possible to use any of conventionally known current collectors used in positive electrodes for lithium ion secondary batteries. For example, an aluminum foil having a thickness of 10 to 30 μm is preferred.

As the composition of the positive electrode material mixture layer, for example, the amount of the positive electrode active material is preferably 80.0 mass % or more and 99.8 mass % or less, the amount of the conductivity enhancing agent is preferably 0.1 mass % or more and 10 mass % or less, and the amount of the binder is preferably 0.1 mass % or more and 10 mass % or less. The positive electrode material mixture layer has a thickness of, for example, 10 to 120 μm for one surface of the current collector.

The separator used in the lithium ion secondary battery preferably has the property of being able to close its pores (i.e., shutdown function) at 80° C. or higher (more preferably 100° C. or higher) and 170° C. or lower (more preferably 150° C. or lower). Separators generally used in lithium ion secondary batteries, for example, microporous films made of polyolefin such as polyethylene (PE), polypropylene (PP) or the like, can be used. For example, the separator may be composed of a microporous film made only of PE or PP or may be composed of a laminate of a PE microporous film and a PP microporous film. It is preferable that the thickness of the separator is 10 to 30 μm for example.

The above-described positive electrode, the above-described negative electrode and the above-described separator can be used in the form of a laminate electrode assembly in which the positive electrode and the negative electrode are laminated with the separator interposed therebetween or a wound electrode assembly obtained by spirally winding the laminate electrode assembly, in the lithium ion secondary battery of the present invention.

As the configuration of the lithium ion secondary battery of the present invention, the battery can be a cylindrical (rectangular cylinder, circular cylinder or the like) battery using a steel can, an aluminum can or the like as the outer case can. Alternatively, the battery may be a soft package battery using a laminated film having a metal deposited thereon as an outer case.

It is preferable that the lithium ion secondary battery of the present invention has a high capacity and favorable high-power discharge characteristics. Specifically it is preferable that a relationship of A/B≥4 is satisfied when A (mA) indicates a current value for discharging the capacity of battery (set capacity) in one hour and B (cm$^2$) indicates an opposed area between the positive electrode material mixture layer and the negative electrode material mixture layer. Such a lithium ion secondary battery can ensure a capacity density of 170 Wh/kg or more for example when discharge is carried out at a current value (2C) for discharging the battery capacity in ½ hour. Therefore, the battery can be applied favorably to a power source for industrial machinery or various backup power sources which are required to have a high capacity and to have high-power discharge characteristics.

In order to satisfy the relationship of A/B≥4 in the lithium ion secondary battery of the present invention, it is only required to increase the amount of the active material to be introduced into the battery, for example by using a positive electrode that includes a positive electrode active material of a higher capacity (e.g., a lithium-containing transition metal oxide containing Ni) in combination with a negative electrode containing $SiO_x$, increasing the density of the material mixture layers of the positive and negative electrodes, or by increasing the thickness of the material mixture layers of the positive and negative electrodes.

As mentioned above, in a case where the thickness of the material mixture layers of the positive and negative electrodes of the lithium ion secondary battery is increased, the lithium ion concentration gradient in the material mixture layers becomes greater, and it may cause a problem that the active material present at the depth of the layers would not function effectively. However, in the lithium ion secondary battery of the present invention where the above-mentioned nonaqueous electrolyte is used, as the concentration gradient of the lithium ion in the material mixture layers can be relieved, the capacity inherent in the battery can get the best performance from the battery.

In particular, a lithium ion secondary battery to be applied to the above-mentioned uses (for example, power sources for industrial machinery and various backup power sources) is often used so that the entire capacity is not used up at discharging but is re-charged. In a lithium ion secondary battery applied to such a use is required particularly to have a favorable charge-discharge cycle characteristics in a region where the SOC (State Of Charge: charging rate of battery) is relatively high. The lithium ion secondary battery of the present invention is excellent also in such charge-discharge cycle characteristics.

EXAMPLES

The present invention will be described in detail below with reference to Examples, although the present invention is not limited by the following Examples.

The conductivity at 25° C. of the nonaqueous electrolyte as shown in the Examples are values measured by using Electric conductivity meter "CM-31P" and Electric conductivity cell "CT-27112B" both of which are manufactured by DKK TOA Corporation.

Example 1

<Production of Positive Electrode>

Using NMP as a solvent, 94 mass parts of $Li_{1.02}Ni_{0.94}Mn_{0.03}Mg_{0.03}O_2$ serving as a positive electrode active material, 6 mass parts of acetylene black serving as a conductivity enhancing agent, and 2 mass parts of PVDF serving as a binder were uniformly mixed to prepare a positive electrode material mixture-containing paste. This paste was applied intermittently onto both surfaces of a 15 μm thick aluminum foil, which would serve as a current collector, such that the application amount for one surface was 23 mg/cm$^2$, the application length was 280 mm on the front face and 210 mm on the back face, followed by drying. Then, calendering was performed so as to adjust the thickness of the positive electrode active material mixture layer to 87 μm for one surface, and cutting was performed so as to bring the width thereof to 43 mm. Thus, a positive electrode was produced. Thereafter, a tab was attached to an exposed portion of the aluminum foil of the positive electrode.

<Production of Negative Electrode>

By using water as a solvent, 98 mass parts of a negative electrode active material prepared by mixing a composite formed by covering with a carbon material the surface of SiO whose average particle diameter was 8 μm (the amount of the carbon material in the composite was 10 mass % or less; hereinafter, this is called "SiO/carbon material composite") and graphite whose average particle diameter was 16 μm so that the amount of SiO/carbon material composite would be 3.7 mass % was uniformly mixed with 5 mass parts of PVDF, thereby obtaining a negative electrode material mixture-containing paste. This paste was applied intermittently onto both surfaces of a 10 μm thick copper foil, which would serve as a current collector, such that the application amount for one surface was 9.8 mg/cm$^2$, the application length was 290 mm on the front face and 230 mm on the back face, followed by drying. Then, calendering was performed so as to adjust the thickness of the negative electrode active material layer to 59 μm for one surface, and cutting was performed so as to bring the width thereof to 45 mm. Thus, a negative electrode was produced. Thereafter, a tab was attached to an exposed portion of the copper foil of the negative electrode.

<Assembly of battery>

The thus obtained positive electrode and negative electrode were placed upon each other with the above-described separator (a microporous film separator made of PE-PP for a lithium ion secondary battery, formed by laminating a microporous film of PE and a microporous film of PP, having a thickness of 16 μm, porosity of 40%, average pore diameter of 0.08 μm, PE melting point: 135° C., and PP melting point: 165° C.) interposed therebetween, and wound in a spiral fashion to produce a wound electrode group. The obtained wound electrode group was pressed into a flat shape, and placed in an aluminum outer can having a thickness of 4 mm, a height of 50 mm, and a width of 34 mm. An electrolyte (obtained by dissolving $LiPF_6$ at a concentration of 1.8 mol/L in a solvent in which EC and DMC dimethyl carbonate were mixed at a volume ratio of 2:8; the conductivity at 25° C. was 10.8 mS/cm) was injected into the outer can, and then the outer can was sealed. Thus, a lithium ion secondary battery having the structure shown in FIG. 1 and the external appearance shown in FIG. 2 was produced. In this lithium ion secondary battery, A/B was 4, which was the relationship between a current value A (mA) for discharging the capacity of the battery in one hour and the opposing area B ($cm^2$) between the positive electrode material mixture layer and the negative electrode material mixture layer.

The battery shown in FIG. 1 and FIG. 2 will now be described. A positive electrode 1 and a negative electrode 2 are housed in a prismatic outer can 4 together with a nonaqueous electrolyte as a wound electrode group 6, which has been wound in a spiral fashion with a separator 3 interposed therebetween as described above. However, in order to simplify the illustration of FIG. 1, metal foils serving as current collectors and the nonaqueous electrolyte that were used to produce the positive electrode 1 and the negative electrode 2 are not illustrated.

The outer can 4 constitutes an outer jacket of the battery. The outer can 4 also serves as a positive electrode terminal. An insulator 5 made of a PE sheet is placed on the bottom of the outer can 4, and a positive electrode current collector plate 7 and a negative electrode current collector plate 8 connected to the ends of the positive electrode 1 and the negative electrode 2 respectively, are drawn from the electrode group 6 made up of the positive electrode 1, the negative electrode 2 and the separator 3. A stainless steel terminal 11 is attached to a cover plate 9 made of an aluminum alloy for sealing the opening of the outer can 4 with a PP insulating packing 10 interposed therebetween, and a stainless steel lead plate 13 is attached to the terminal 11 with an insulator 12 interposed therebetween.

The cover plate 9 is inserted in the opening portion of the outer can 4. By welding the junction of the cover plate 9 and the opening portion, the opening portion of the outer can 4 is sealed and thus the inside of the battery is sealed.

Figure 2:
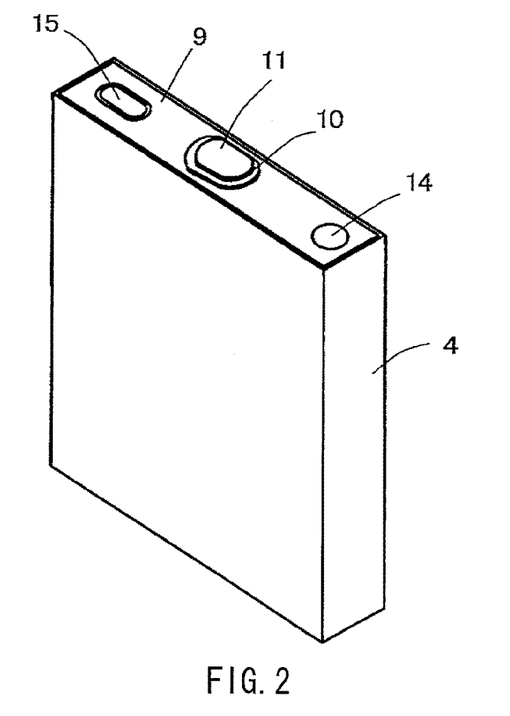
FIG. 2 is a perspective view showing the nonaqueous secondary battery shown in FIG. 1.

In addition, the cover plate 9 is provided with an injection opening (denoted by Numeral 14 in FIG. 2). The nonaqueous electrolyte is injected into the battery from the injection opening during assembly of the battery, and then the injection opening is sealed. Further, a safety valve 15 for preventing explosion is formed at the cover plate 9.

In the battery of Example 1, the outer can 4 and the cover plate 9 function as a positive electrode terminal by welding the positive electrode current collector plate 7 directly to the cover plate 9, and the terminal 11 functions as a negative electrode terminal by welding the negative electrode current collector plate 8 to a lead plate 13 and conducting the negative electrode current collector plate 8 and the terminal 11 through the lead plate 13. However, depending on the material, etc., of the outer can 4, the positive and the negative may be reversed.

Figure 1A:
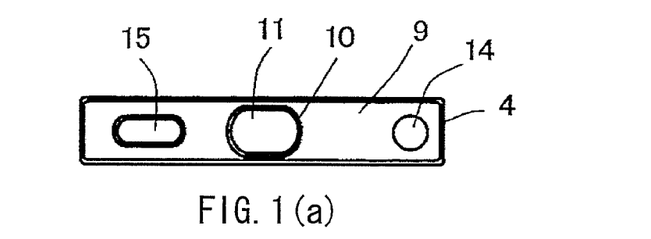
FIG. 1(a) is a plan view and FIG. 1(b) is a partial profile of FIG. 1(a).
Figure 1B:
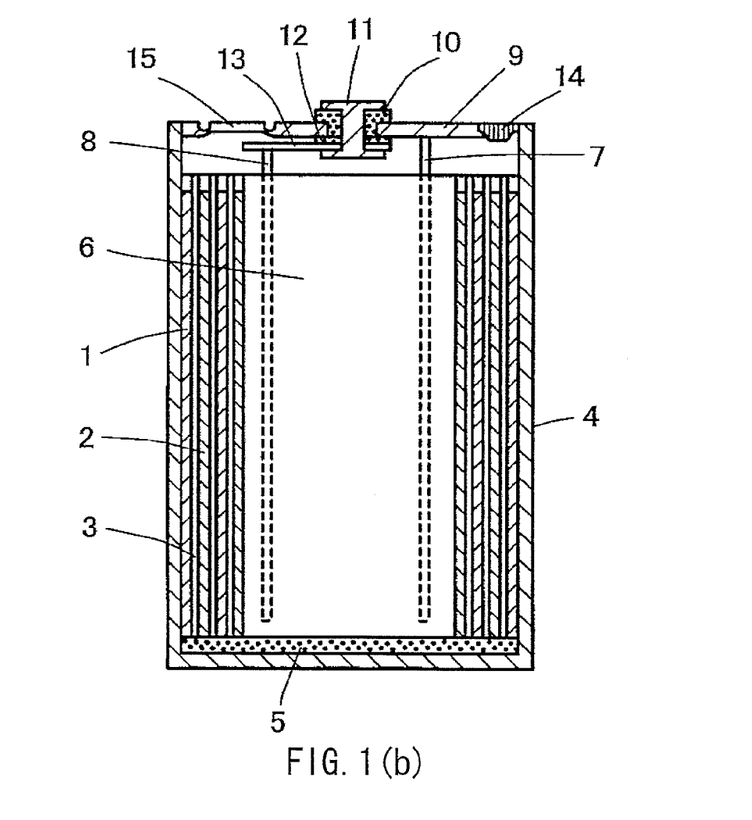

FIG. 2 is a perspective view schematically showing the external appearance of the battery shown in FIG. 1. FIG. 2 is illustrated to indicate that the battery is a prismatic battery. In FIG. 2, the battery is schematically shown and only specific components of the battery are illustrated. Similarly, in FIG. 1, the inner circumferential side of the electrode group is not shown in cross section.

Example 2

A nonaqueous electrolyte was prepared in the same manner as Example 1 except that the concentration of $LiPF_6$ was changed to 1.6 mol/L, and a lithium ion secondary battery was produced in the same manner as Example 1 except that this nonaqueous electrolyte was used. The conductivity of this nonaqueous electrolyte at 25° C. was 11.8 mS/cm.

Example 3

A nonaqueous electrolyte was prepared in the same manner as Example 1 except that the concentration of $LiPF_6$ was changed to 1.4 mol/L, and a lithium ion secondary battery was produced in the same manner as Example 1 except that this nonaqueous electrolyte was used. The conductivity of this nonaqueous electrolyte at 25° C. was 12.2 mS/cm.

Example 4

A nonaqueous electrolyte was prepared in the same manner as Example 1 except that DMC was replaced by DEC, and a lithium ion secondary battery was produced in the same manner as Example 1 except that this nonaqueous electrolyte was used. The conductivity of this nonaqueous electrolyte at 25° C. was 6.9 mS/cm.

Example 5

A nonaqueous electrolyte was prepared in the same manner as Example 1 except that $LiPF_6$ and $LiBF_4$ were used in combination as the electrolyte salt at a molar ratio of 3:1, and that the total concentration thereof was set to 1.6 mol/L ($LiPF_6$ concentration: 1.2 mol/L, $LiBF_4$ concentration: 0.4 mol/L). And a lithium ion secondary battery was produced in the same manner as Example 1 except that this nonaqueous electrolyte was used. The conductivity of this nonaqueous electrolyte at 25° C. was 6.5 mS/cm.

Example 6

A nonaqueous electrolyte was prepared in the same manner as Example 1 except that $LiPF_6$ and $LiN(CF_3SO_2)_2$ were used in combination as the electrolyte salt at a molar ratio of 3:1, and that the total concentration thereof was set to 1.6 mol/L ($LiPF_6$ concentration: 1.2 mol/L, $LiN(CF_3SO_2)_2$ concentration: 0.4 mol/L). And a lithium ion secondary battery was produced in the same manner as Example 1 except that this nonaqueous electrolyte was used. The conductivity of this nonaqueous electrolyte at 25° C. was 7.6 mS/cm.

Example 7

A positive electrode was produced in the same manner as Example 1 except that the application amount of the positive electrode material mixture-containing paste for one surface of the current collector was changed to 15 $mg/cm^2$. Similarly, a negative electrode was produced in the same manner as Example 1 except that the application amount of the negative electrode material mixture-containing paste for one surface of the current collector was changed to 9.5 $mg/cm^2$. And a lithium ion secondary battery was produced in the same manner as Example 1 except that the positive electrode and negative electrode were used. For this lithium ion secondary battery, the relationship A/B between a current value A (mA) for discharging the capacity of the battery in one hour and the opposed area B ($cm^2$) between the positive electrode material mixture layer and the negative electrode material mixture layer was 2.6.

Comparative Example 1

A nonaqueous electrolyte was prepared in the same manner as Example 1 except that the concentration of $LiPF_6$ was changed to 1.0 mol/L, and a lithium ion secondary battery was produced in the same manner as Example 1 except that this nonaqueous electrolyte was used. The conductivity of this nonaqueous electrolyte at 25° C. was 11.8 mS/cm.

Comparative Example 2

A nonaqueous electrolyte was prepared by using PC alone as a solvent, and by dissolving $LiPF_6$ in the solvent at a concentration of 1.0 mol/L. A lithium ion secondary battery was produced in the same manner as Example 1 except that this nonaqueous electrolyte was used. The conductivity of this nonaqueous electrolyte at 25° C. was 5.8 mS/cm.

The following description refers to the concentrations of the electrolyte salts at which the conductivity is maximized in the nonaqueous electrolytes used in the respective lithium ion secondary batteries for Examples and Comparative Examples.

[Examples 1-3, 7 and Comparative Example 1] (electrolyte salt: $LiPF_6$, organic solvent: a solvent as a mixture of EC and DMC at a volume ratio of 2:8): 1.2 mol/L;

[Example 4] (electrolyte salt: $LiPF_6$, organic solvent: a solvent as a mixture of EC and DEC at a volume ratio of 2:8): 1.0 mol/L;

[Example 5] (electrolyte salt: $LiPF_6$ and $LiBF_4$ used in combination at a molar ratio of 3:1, organic solvent: a solvent as a mixture of EC and DMC at a volume ratio of 2:8): 1.2 mol/L;

[Example 6] (electrolyte salt: $LiPF_6$ and $LiN(CF_3SO_2)_2$ used in combination at a molar ratio of 3:1, organic solvent: a solvent as a mixture of EC and DMC at a volume ratio of 2:8): 1.2 mol/L;

[Comparative Example 2] (electrolyte salt: $LiPF_6$, organic solvent: PC): 0.8 mol/L.

Figure 3:
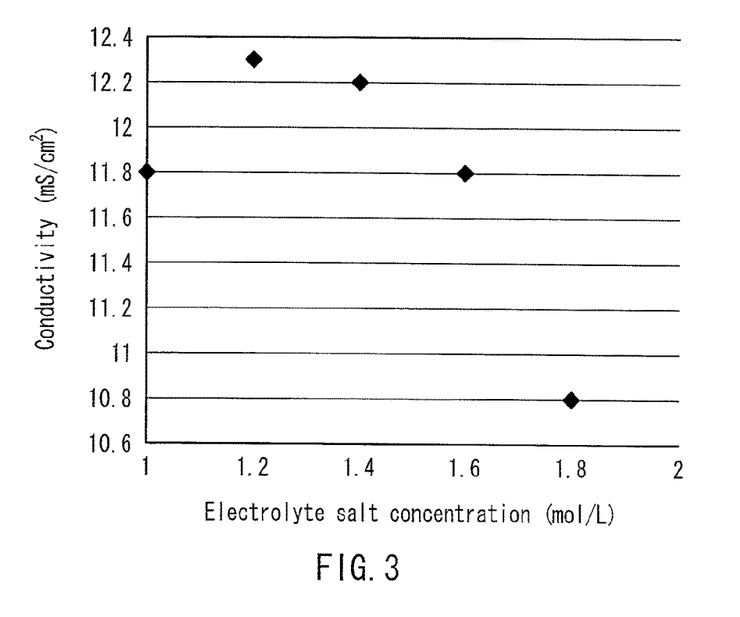
FIG. 3 is a graph for showing a relationship between conductivities and concentrations of electrolyte salts of nonaqueous electrolytes used in the lithium ion secondary batteries in Examples 1-3, 7 and Comparative Example 1.

FIG. 3 is a graph illustrating a relationship between the conductivities and the electrolyte salt concentrations of the respective nonaqueous electrolytes used for the lithium ion secondary batteries in Examples 1-3, 7 and Comparative Example 1.

Each of the following evaluations was performed on the lithium ion secondary batteries in Examples and Comparative Examples. Table 1 shows the results.

<Charge-Discharge Test>

The lithium ion secondary batteries of Examples and Comparative Examples were subjected to constant current charging with a current of 1 C until the voltage reached 4.2 V, and then subjected to constant voltage charging at 4.2 V until the current value reached 0.1 C. Later, the batteries were subjected to constant current discharging with a current of 1 C until the voltage reached 2.5 V. From the thus obtained discharging capacity, the capacity density (Wh/kg) of a battery per mass was calculated.

The respective batteries as mentioned above were subjected to constant current charging with a current of 1 C until the voltage reached 4.2 V, and then subjected to constant voltage charging at 4.2 V until the charging capacity reached 70% of the battery capacity (the discharging capacity measured at the time of calculating the capacity density of a battery per mass: namely, initial capacity). In a case where the charging to 70% of the initial capacity was impossible, after the batteries were subjected to constant current charging with a current of 1 C until the voltage reached 4.2 V, and then subjected to constant voltage charging at 4.2 V until the current value was lowered to 0.1 C. Later, the batteries were subjected to constant current discharging with a current of 1 C until 50% of the initial capacity was discharged completely (the discharge would be stopped in a case where the voltage became lower than 2.5 V). The series of operations were determined as one cycle, this cycle was repeated, and the number of cycles enabling discharge of 40% of the initial capacity was calculated.

<Storage Test>

The respective lithium ion secondary batteries (which are different from the batteries subjected to the above-mentioned charge-discharge test) in Examples and Comparative Examples were subjected to constant current charging with a current of 1 C until the voltage reached 4.2 V, and then subjected to constant voltage charging at 4.2 V until the current value reached 0.1 C. Each of the thus charged batteries was stored for 30 days in a thermostatic oven that had been set at 60° C. Each battery taken out from the thermostatic oven was subjected to discharging with a current of 1 C until the voltage reached 2.5 V so as to calculate the discharging capacity (maintenance capacity). Further, each of the batteries whose maintenance capacity had been calculated was subjected to a constant-current constant-voltage charging and a constant-current discharging so as to calculate a discharging capacity (recovery capacity). The maintenance capacity and recovery capacity mentioned above are expressed in relative values (%) when the discharging capacity obtained at the time of measuring the capacity density in the charge-discharge test is assumed to be 100%.

TABLE 1

|  | Capacity density (Wh/kg) | Number of cycles capable of discharging 40% of initial capacity (times) | Storage test (60° C., 30 days) | |
|---|---|---|---|---|
|  |  |  | Maintenance capacity (%) | Recovery capacity (%) |
| Example 1 | 177 | 4000 | 65 | 75 |
| Example 2 | 177 | 3000 | 63 | 72 |
| Example 3 | 177 | 2200 | 63 | 70 |
| Example 4 | 177 | 800 | 63 | 66 |
| Example 5 | 177 | 2500 | 64 | 56 |
| Example 6 | 177 | 2400 | 64 | 66 |
| Example 7 | 115 | >5000 | 68 | 80 |
| Com. Ex. 1 | 177 | 300 | 50 | 55 |
| Com. Ex. 2 | 80 | 50 | 45 | 55 |

*Com. Ex.: Comparative Example

In Table 1, ">5000" in the column of "Number of cycles capable of discharging 40% of initial capacity" indicates that the discharging capacity exceeded 80% of the initial capacity even when charge and discharge of 5000 cycles were repeated.

As shown in Table 1, for each of the lithium ion secondary batteries of Examples 1-7 using a nonaqueous electrolyte containing an electrolyte salt at a concentration higher than the concentration at which the conductivity is maximized, the number of cycles capable of discharging 40% of the initial capacity was greater than those of the battery in Comparative Example 1 where a nonaqueous electrolyte containing an electrolyte salt at a concentration lower than the concentration at which the conductivity is maximized, or the battery in Comparative Example 2 where a nonaqueous electrolyte whose conductivity is extremely low was used. Thus, high charge-discharge cycle characteristics are ensured irrespective of negative electrodes containing $SiO_x$.

In particular, for the lithium ion secondary batteries of Examples 1-6, the above-mentioned A/B value was set to 4 in order to increase the capacity. In these batteries, a capacity density greater than that of the lithium ion secondary battery of Example 7 in which the A/B value was set to 2.6 is ensured, and thus, it is considered that even if the thickness of material mixture layers of the positive and negative electrodes are increased, the active material present at the depth of the layers can be utilized favorably.

Furthermore, the lithium ion secondary batteries of Examples 1-7 have high maintenance capacities and high recovery capacities after the storage test, and the storage properties also are excellent.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

The lithium ion secondary battery of the present invention can be applied preferably to various uses to which conventionally known lithium ion secondary batteries have been applied, such as a power source for industrial machinery and various backup power sources.

EXPLANATION OF LETTERS AND NUMERALS 1 positive electrode
2 negative electrode
3 separator

The invention claimed is:

1. A lithium ion secondary battery comprising a positive electrode having a positive electrode material mixture layer, a negative electrode, a separator and a nonaqueous electrolyte containing at least an electrolyte salt and an organic solvent,
   wherein the negative electrode has a negative electrode material mixture layer that comprises as a negative electrode active material a composite of a material containing Si and O as constituent elements and a carbon material,
   wherein an atomic ratio x of O to Si is $0.5 \leq x \leq 1.5$,
   the nonaqueous electrolyte contains the electrolyte salt at a concentration of higher than 1.2 mol/L and has a conductivity at 25° C. of 6.5 to 12.2 mS/cm,
   a relationship of A/B≥4 is satisfied when A (mA) indicates a current value for discharging a capacity of the lithium ion secondary battery in an hour and B (cm$^2$) indicates an opposed area between the positive electrode material mixture layer and the negative electrode material mixture layer, and
   the nonaqueous electrolyte further contains 4-fluoro-1,3-dioxolan-2-one as halogen-substituted cyclic carbonate, and at least one selected from dimethyl carbonate and diethyl carbonate as chain carbonate.

2. The lithium ion secondary battery according to claim 1, wherein the nonaqueous electrolyte contains the electrolyte salt at a concentration of 1.4 mol/L or higher and lower than 30 mol/L.

3. The lithium ion secondary battery according to claim 1, wherein the electrolyte salt in the nonaqueous electrolyte is LiPF$_6$, LiBF$_4$ or an imide salt.

4. The lithium ion secondary battery according to claim 1, containing further graphite as a negative electrode active material.

* * * * *